United States Patent
Lind et al.

(10) Patent No.: US 8,984,292 B2
(45) Date of Patent: Mar. 17, 2015

(54) KEYED HUMAN INTERACTIVE PROOF PLAYERS

(75) Inventors: Jesper B. Lind, Bellevue, WA (US); Darko Kirovski, Kirkland, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 849 days.

(21) Appl. No.: 12/822,181

(22) Filed: Jun. 24, 2010

(65) Prior Publication Data

US 2011/0320822 A1 Dec. 29, 2011

(51) Int. Cl.
*G06F 21/00* (2013.01)
*G06F 21/31* (2013.01)

(52) U.S. Cl.
CPC ...... *G06F 21/316* (2013.01); *G06F 2221/2103* (2013.01)
USPC .......................................................... 713/182

(58) Field of Classification Search
USPC ........... 713/182, 186, 202; 726/3, 5–7, 14, 16
See application file for complete search history.

(56) References Cited

U.S. PATENT DOCUMENTS

| | | | |
|---|---|---|---|
| 7,337,324 B2 | 2/2008 | Benaloh et al. | |
| 7,505,946 B2 | 3/2009 | Chellapilla et al. | |
| 7,523,499 B2 | 4/2009 | Wilkins et al. | |
| 7,533,411 B2 | 5/2009 | Goodman et al. | |
| 7,533,419 B2 | 5/2009 | Paya et al. | |
| 7,624,277 B1 | 11/2009 | Simard et al. | |
| 2005/0065802 A1 | 3/2005 | Rui et al. | |
| 2007/0026372 A1 | 2/2007 | Huelsbergen | |
| 2009/0044013 A1 | 2/2009 | Zhu et al. | |
| 2009/0044264 A1 | 2/2009 | Ramanathan et al. | |
| 2009/0077629 A1 | 3/2009 | Douceur et al. | |
| 2009/0083826 A1 | 3/2009 | Baribault | |
| 2009/0150983 A1 | 6/2009 | Saxena et al. | |
| 2009/0153292 A1* | 6/2009 | Farb | 340/5.52 |
| 2009/0259588 A1 | 10/2009 | Lindsay | |
| 2011/0209076 A1* | 8/2011 | Saxena et al. | 715/764 |
| 2011/0292031 A1 | 12/2011 | Zhu et al. | |

OTHER PUBLICATIONS

Lopresti, Daniel., "Leveraging the CAPTCHA Problem", Retrieved at << http://citeseerx.ist.psu.edu/viewdoc/download?doi=10.1.1.90.9928&rep=rep1&type=pdf >>, In Proceedings of the Second International Workshop on Human Interactive Proofs, May 2005.

(Continued)

*Primary Examiner* — Farid Homayounmehr
*Assistant Examiner* — Suman Debnath
(74) *Attorney, Agent, or Firm* — Julie Kane Akhter; Sade Fashokun; Micky Minhas

(57) ABSTRACT

A human interactive puzzle (HIP) authorization architecture where keyed and animated puzzles are executed by HIP players which are distinct and obfuscated to the point where breaking a single player is a relatively costly operation. A key is created in response to a request for a service, a HIP player is created based on the key, and a small installation executable is created that expands during installation to produce a computationally expensive data structure on the client relative to verification of the solution at the server. Thus, copying of the player or relay of the puzzle to a third system requires more time than allowed to receive the solution at the server.

20 Claims, 8 Drawing Sheets

(56) References Cited

OTHER PUBLICATIONS

Chellapilla, et al., "Designing Human Friendly Human Interaction Proofs (HIPs)", Retrieved at << http://research.microsoft.com/en-us/um/people/kumarc/pubs/chellapilla_chi05.pdf >>, Conference on Human Factors in Computing Systems, Proceedings of the SIGCHI conference on Human factors in computing systems, Apr. 2-7, 2005.
Toub, Stephen., "Human Interactive Proofs", Retrieved at << http://msdn.microsoft.com/en-us/library/ms972952.aspx >>, Sep. 2004.
Ahn, et al., "CAPTCHA: Using Hard AI Problems for Security", Retrieved at << http://www.captcha.net/captcha_crypt.pdf >>, In Proceedings of Eurocrypt, vol. 2656, 2003.
Elson, et al., "Asirra: A CAPTCHA that Exploits Interest-aligned Manual Image Categorization", Retrieved at << http://sawoy.mylivepage.com/files/Asirra%20-%20A%2OCAPTCHA%20that%20Exploits%20Interest-Aligned%20Manual%20Image%20Categorization.pdf >>, Proceedings of the 2007 ACM Conference on Computer and Communications Security, CCS, Oct. 29-Nov. 2, 2007.
Chellapilla, et al., "Computers Beat Humans at Single Character Recognition in Reading based Human Interaction Proofs (HIPs)", Retrieved at << http://research.microsoft.com/en-us/um/people/kumarc/pubs/chellapilla_CEAS05.pdf >>, CEAS, Second Conference on Email and Anti-Spam, Jul. 21-22, 2005.
Doctorow, Cory., "C. Doctorow. Solving and Creating CAPTCHAs with Free Porn. Boing Boing, 2004.", Retrieved at << http://www.boingboing.net/2004/01/27/ solving-and-creating.html >>, Jan. 27, 2004.
Barak, et al., "On the (Im)possibility of Obfuscating Programs", Retrieved at << http://www.iacr.org/archive/crypto2001/21390001.pdf >>, Lecture Notes in Computer Science, vol. 2139, Proceedings of the 21st Annual International Cryptology Conference on Advances in Cryptology, Aug. 19-23, 2001.
Dwork, et al., "Pricing Via Processing or Combatting Junk Mail", Retrieved at << http://dsns.csie.nctu.edu.tw/research/crypto/HTML/PDF/C92/139.PDF >>, Lecture Notes in Computer Science, vol. 740, Proceedings of the 12th Annual International Cryptology Conference on Advances in Cryptology, Aug. 16-20, 1992.
Abadi, et al., "Moderately Hard, Memory-bound Functions", Retrieved at << http://www.isoc.org/isoc/conferences/ndss/03/proceedings/papers/2.pdf >>, ACM Transactions on Internet Technology (TOIT), vol. 5, No. 2, May 2005.
Dwork, et al., "On Memory-bound Functions for Fighting Spam", Retrieved at << http://research.microsoft.com/pubs/65154/crypto03.pdf >>, Proceedings of the 23rd Annual International Cryptology Conference (CRYPTO 2003), Aug. 2003.
Chellapilla, et al., "Using Machine Learning to Break Visual Human Interaction Proofs (HIPs)", retrieved at << http://research.microsoft.com/en-us/um/people/kumarc/pubs/chellapilla_nips04.pdf >>, in Advances in Neural Information Processing Systems (NIPS2005), dated 2005, pp. 265-272.
Misra, et al., "Face Recognition CAPTCHAs", In Proceedings of the Advanced International Conference on Telecommunications and International Conference on Internet and Web Applications and Services (AICT/ICIW 2006), Feb. 19-25, 2006, pp. 6.
Chellapilla, et al., "Designing Human Friendly Human Interaction Proofs (HIPs)", In Proceedings of the SIGCHI Conference on Human Factors in Computing Systems (CHI '05), Apr. 2-7, 2005, pp. 711-720.
"Microsoft Human Interaction Proof (HIP) Technical and Market Overview", retrieved at << http://download.microsoft.com/download/3/2/0/320e814a-d969-4c6c-a26e-2f3115032d4c/Human_interaction_Proof_Technical_Overview.doc>>, 2006, pp. 9.
"International Search Report", Mailed Date: Jan. 2, 2012, Application No. PCT/US2011/041016, Filed Date: Jun. 19, 2011, pp. 9. (MS# 329556.02).
Chellapilla, et al., "Computers beat Humans at Single Character Recognition in Reading based Human Interaction Proofs (HIPs)", Retrieved at <<research.microsoft.com/en-us/um/people/joshuago/.../160.pdf>>, in proceedings of 2nd Conference on Email and Anti-Spam (CEAS'05), 2005, pp. 8.
Chellapilla, et al., "Building Segmentation Based Human-friendly Human Interaction Proofs (HIPs)", Retrieved at <<citeseerx.ist.psu.edu/viewdoc/download?doi... 1...-United States>>, Proceedings of the Second International Workshop on Human Interactive Proofs (HIP'05), 2005, pp. 27.
"Microsoft Live Hotmail Under Attack by Streamlined Anti-CAPTCHA and Mass-mailing Operations", Archived Blog, retrieved at http://securitylabs.websense.com/contenIIBlogs/3063.aspx>>, Apr. 10, 2008, pp. 9.

\* cited by examiner

KEYED HUMAN INTERACTIVE PROOF PLAYERS

CROSS-REFERENCE TO RELATED APPLICATIONS

This application is related to pending U.S. patent application Ser. No. 12/821,124 entitled "AUTOMATIC CONSTRUCTION OF HUMAN INTERACTION PROOF ENGINES" filed on Jun. 22, 2010, the entirety of which is incorporated by reference herein.

BACKGROUND

Existing systems are continually under attack by users seeking unauthorized access to protected information. A human interactive proof (HIP) is a simple arbitrary test posed by a server to a client to validate that the intelligence behind the client is human's. Another type of HIP is a CAPTCHA (Completely Automated Public Turing test to tell Computers and Humans Apart) where the user is requested to enter alpha-numeric characters presented in a skewed and distorted manner and which are difficult to read and enter using a robot ("bot") program.

The primary motivation in using a HIP is to filter scripted attacks to web services which aim at consuming vast amount of server resources for spam or other malicious activities. For example, a simple script could open a large number of email accounts with a web-mail service and then use these accounts to spam "human" email accounts. While traditional HIPs have proven effective in constrained scenarios, in the general case the HIPs leave a lot to be desired.

HIPs provided as images that entail transformed characters and rely on the difficulties associated with OCR (optical character recognition) have already been broken using simple OCR techniques that focus on the intricacies of HIP generation algorithms. Alternative HIP schemes rely on visual tests that computers cannot solve easily such as separating dogs from cats in a collection of photos. However, both methods are easily broken using a relay attack where a HIP test is forwarded to a sweatshop where a human solves HIP puzzles for pay or free services, an attack technique that defeats the very purpose of the HIP.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, the disclosed architecture employs a human interactive proof (HIP) with additional features that add substantial costs to relay attacks. It is an economic tool that makes the pipeline for breaking HIPs costlier by making HIP players bulky in terms of required computational resources to render the HIP at the client (e.g., by maximizing the minimal state required to render and solve a HIP), and relatively cheap at the server to generate and validate.

The architecture employs a keyed HIP player, which is a browser plug-in that takes as an input a common HIP puzzle description and distinctly animates the HIP puzzle for the user. The user in turn tries to solve the puzzle to prove that the user is human. The HIP player sends the solution to the puzzle back to the server, which conditionally, in case the answer is correct, grants access to a service.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
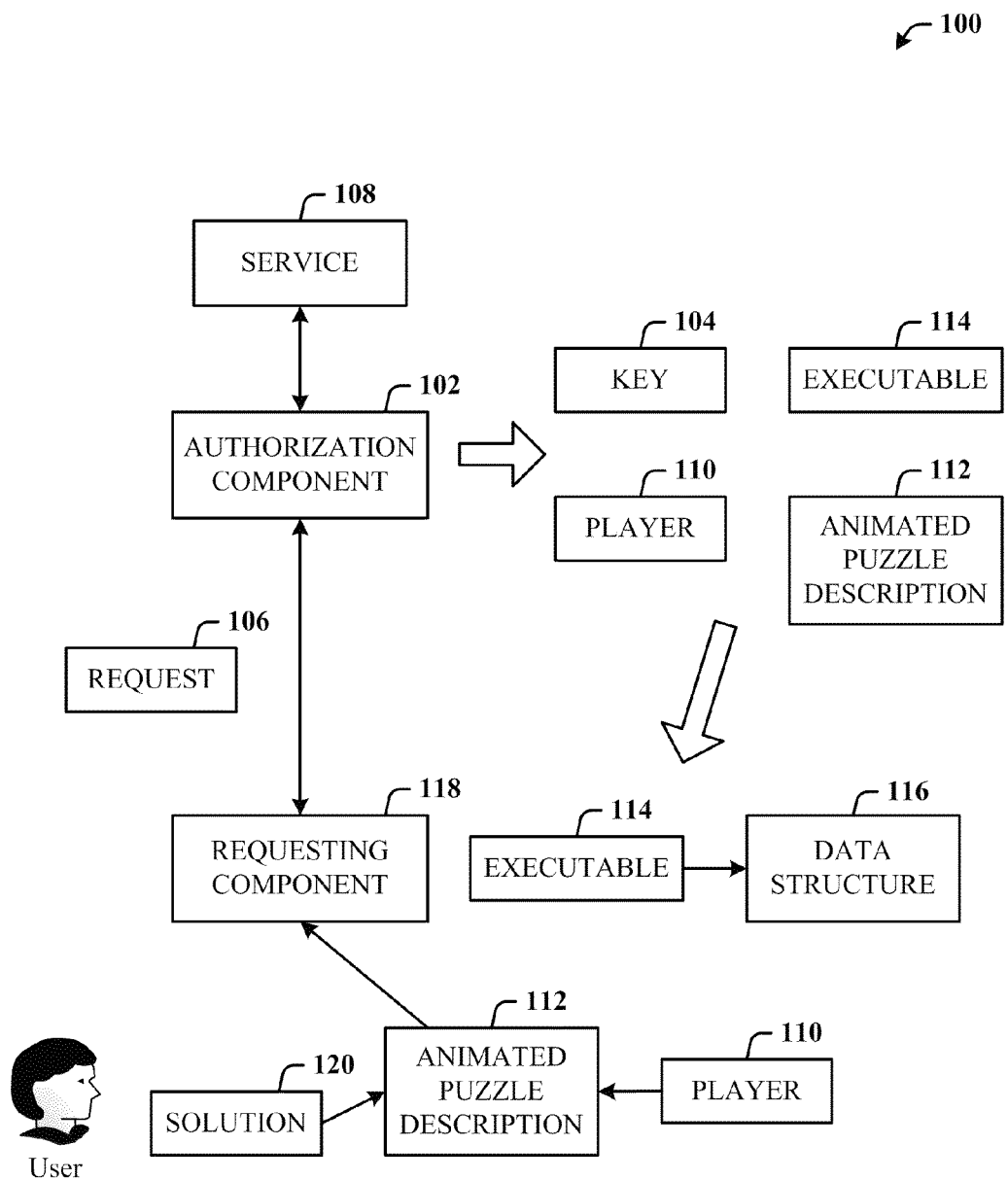
FIG. 1 illustrates authorization system in accordance with the disclosed architecture.

Following is a description of the typical actors in a relay attack. Consider a web server S running a service that is of value to an adversary such as a pseudo company referred to as Web-mail. The adversary employs a farm of bots $\mathbb{B}$ (software programs that run automated tasks), deployed to access web server S, as well as a sweatshop $\mathbb{P}$ (a network of computers with human users that can solve HIPs (human interactive proofs) on-demand for pay and/or service). A HIP sent to one of the bots $B_j \in \mathbb{B}$ (e.g., as a result of an inquiry to open a new Web-mail account) is immediately forwarded to a person $P_i \in \mathbb{P}$ in the sweatshop $\mathbb{P}$ who solves the puzzle and sends the answer back to the bot $B_j$. The bot replies to web server S with the obtained answer. If the solution is correct, web server S grants access to bot $B_j$, which in turn can now proceed with a malicious action such as sending spam from this account.

In the traditional HIP system, for each opening of an account X and/or each spam-like outbound access to the web-server S generates a HIP puzzle and delivers the puzzle to the computer which is accessing the account. The cost of generating a HIP puzzle is denoted $G_1$ and the cost of puzzle delivery is denoted $d_1$. The cost of receiving and processing the solution from the end-user is small and denoted as $\epsilon_1$. To reduce the only major cost $G_1$ in this process web server S reuses the same HIP L times. The per-access cost of a HIP test at the server equals is then:

$$C_{S,1} = \frac{G_1}{L} + d_1 + \varepsilon_1$$

From the perspective of the adversary Web-mail, the cost of defeating this system is relatively low. When bot $B_j$ desires to open an account with web server S, the bot $B_j$ receives the HIP puzzle, forwards it to person $P_i$ at a cost $d_1$, where person $P_1$ solves the puzzle at a cost p, and sends the solution to bot $B_j$ at a cost approximately equal to $\epsilon_1$. The bot $B_j$ then forwards the solution to web server S. The total cost of the attack is described as follows:

$$C_{B_j,1} = p + d_1 + \epsilon_1$$

It would appear that cost p would dominate the bill; however, service-based attacks (e.g., offering access to content in return for HIP answers) could potentially reduce cost p to an exceptionally small amount. Several observations can be made. Although the cost of maintaining a farm of bots is significant, this cost can be ignored as both implementations of the attack rely on maintaining the same network of bots. Additionally, the cost of the relay attack is exceptionally small once the adversary has access to a farm of bots (compared to the remainder of the bill for sending spam such as constructing emails and obtaining e-mail addresses, $C_{B_j,1}$ will have negligible effect on the adversary). The cost of the software platform that the adversary needs to develop to run the spamming operation, is non-reoccurring, and hence, can be amortized over the lifetime of the operation. Lastly, the "security" of a specific image-based HIP implementation (how hard is it to solve a HIP puzzle by a specialized optical character recognition (OCR) algorithm) affects the overall system cost only if it is exceptionally poor.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates authorization system 100 in accordance with the disclosed architecture. The system 100 includes an authorization component 102 that generates a key 104 in response to a request 106 for a service 108. The key 104 is used to create a player 110 that plays an animated puzzle description 112 and to create an executable 114 that builds a data structure 116. The system 100 also includes a requesting component 118 that installs the player 110 and runs the executable 114 to build the data structure 116. The player 110 plays the animated puzzle description 112 as a human-recognizable abstraction for which a solution 120 is input and sent to the authorization component 102 to obtain the service 108.

The player 110 is a human interactive proof player created specific to the key 104. The key 104 is obfuscated in the player 110. The data structure 116 can be made permanent or perishable. The player 110 can be HIP player is a browser plug-in. The key 104 defines the data structure 116 of the executable 114. The authorization component 102 sends the animated puzzle description 112 and a pointer to arbitrary subparts of the data structure 116 to the requesting component 118 to create the animated puzzle description 112. The authorization component 102 verifies the solution 120 based on the animated puzzle description 112 and the pointer. The data structure 116 expands according to a time that is greater than a time to utilize the player 110 at a location different than the requesting component 118.

These and other features will now be described in detail. Following are term definitions related to program obfuscation. Program obfuscation is a functional transformation of a program binary that seeks to prevent a third party from either understanding program's functionality (type-I) or accessing a specific program constant or variable (type-II) or both (type-III). Here, typically prevention is not enforced formally; rather, the objective of obfuscation is to make the adversarial goal cumbersome and expensive.

Figure 2:
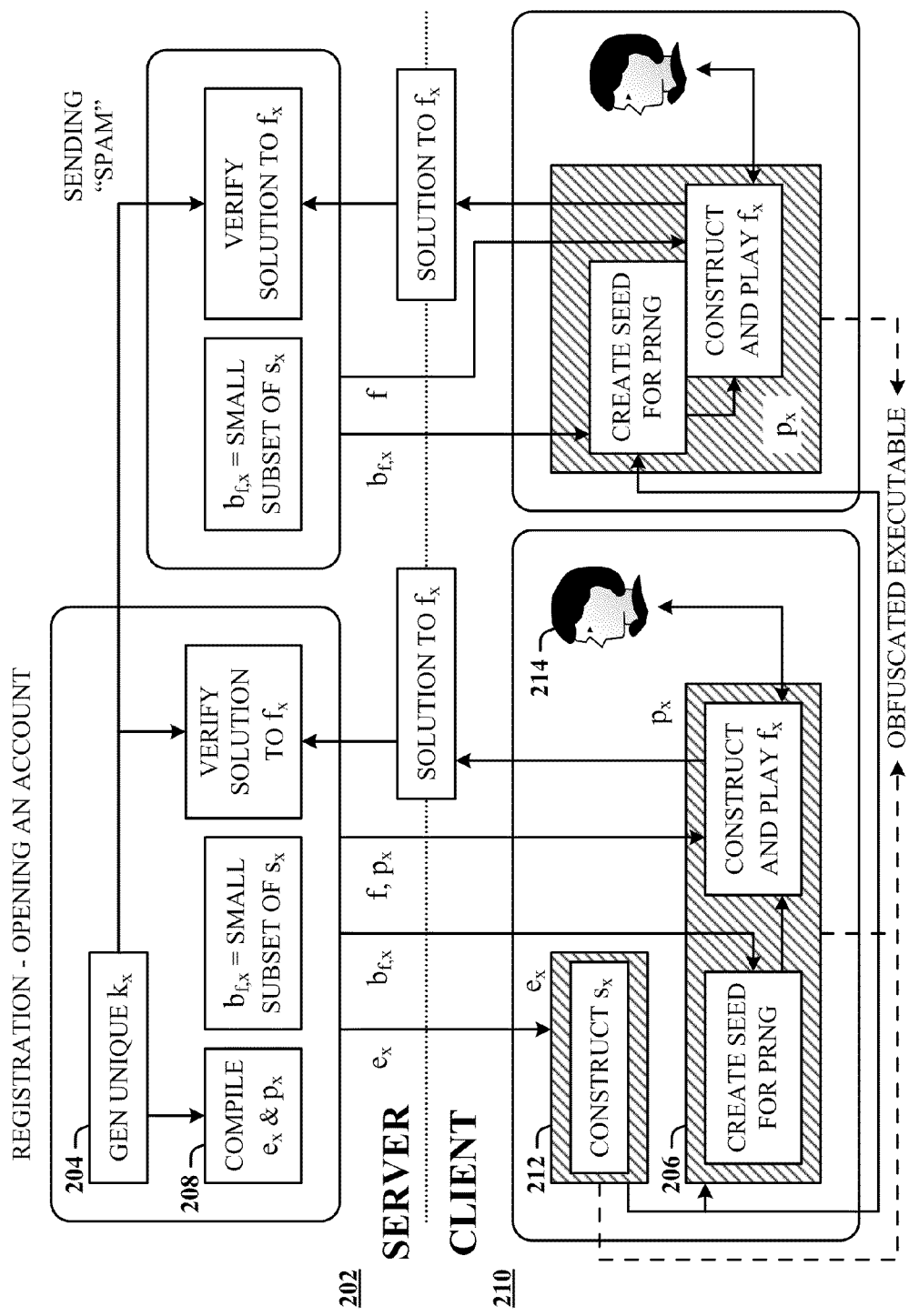
FIG. 2 illustrates an alternative embodiment of a keyed HIP player authorization system in accordance with the disclosed architecture.

FIG. 2 illustrates an alternative embodiment of a keyed HIP player authorization system 200 in accordance with the disclosed architecture. In accordance with the disclosed architecture, a HIP system 200 is provided such that when creating an account X (registration) on the web server S (denoted as SERVER 202), web server S initially generates a distinctive key $k_x$ (at 204), and uses the key $k_x$ to create (e.g., compile) a correspondingly distinctive HIP player $p_x$ 206 (also the player 110 of FIG. 1) and define a correspondingly distinctive initial state $s_x$. The HIP player $p_x$ is compiled (at 208) at the web server S such that all players are functionally the same, but with different executables via type-I obfuscation. Additional requirements imposed include the following: from player $p_x$ a user cannot identify (e.g., reverse engineer) the distinctive $k_x$. Additionally, player $p_x$ does not contain key $k_x$ (thus, there is no need for type-II obfuscation at this point).

Web server S also generates (compiles at 208) a distinct small executable $e_x$ that builds a relatively large unique initial program state $s_x$ (denoted CONSTRUCT $s_x$) on the client (denoted CLIENT 210). As opposed to player $p_x$, executable $e_x$ is a type-III obfuscated program. Obfuscation protects both the program functionality as well as the key $k_x$ stored as a program constant in executable $e_x$ and used to uniquely initiate pseudo-random number generation within executable $e_x$, and consequently, generate a $k_x$-specific initial program state $s_x$.

Thus, two executables $e_x$ and $e_y$ associated with two different corresponding accounts X and Y have the same functionality, yet build two distinctive states $s_x$ and $s_y$, respectively. After the client 210 receives player $p_x$ 206 and executable $e_x$ 212 the client 210 installs player $p_x$ 206 and runs executable $e_x$ 212 to construct initial program state $s_x$ (CONSTRUCT $s_x$). Let time $t_e$ denote the time it takes executable $e_x$ to construct initial program state $s_x$.

For each HIP puzzle f issued to a client (e.g., client 210), web server S generates a pointer to a random substate $b_{f,x}$ in state $s_x$, and then delivers both the random substate $b_{f,x}$ and puzzle f to the client. The client first identifies the value of the random substate $b_{f,x}$ of $s_x$ pointed to by $b_{f,x}$ and uses the value to initiate a pseudo-random number generator (PRNG) in player $p_x$.

The client 210 now renders puzzle f into a unique animated puzzle $f_x = p_x(f, s_x(b_{f,x}))$ with a distinctive solution, where function $p_x(\ )$ denotes rendering. Since each puzzle is animated distinctively at the client 210 based upon initial program state $s_x$ and random substate $b_{f,x}$, a single description package of a HIP puzzle f can be reused by all users. The single description package can even be reused by the same user many times because each puzzle instance is keyed with a distinct random substate $b_{f,x}$. The user 214 then sends the solution to puzzle $f_x$ back to web server S to verify the correctness of the puzzle $f_x$, and if verified, grant access to the service of the web server S.

In order to reduce the workload at web server S, finding the correct solution to puzzle $f_x$ at web server S knowing only the key $k_x$ and random substate $b_{f,x}$ is performed in a computationally efficient manner.

The disclosed HIP architecture raises the costs of the adversary as follows:

- By individualizing executables via obfuscation, the adversary cannot "break" all clients by "breaking" a single client X (that is, extract key $k_x$ from executable $e_x$ and/or understand the functionality of executable $e_x$ and/or player $p_x$). That way, the objective of obfuscation is not to provably protect one executable under all attacks, but to set a relatively high cost on "breaking" each individual executable, and thus, force a relatively high reoccurring cost for the adversary when opening a specific account and sending a spam-like message.
- By making puzzle $f_x$ dependent upon initial program state $s_x$, which requires both substantial storage and time-to-construct at the client, the physical computer (of client 210) that opens an account is tied to future HIP puzzles that are issued when the adversary attempts to send spam-like messages from this account. For the adversary, this means that every time a spam-like message is supposed to be sent from a specific account, the least costly action is to send the spam-like message from the computer that opened the account. Indirectly, this limits the number of accounts that can be used from a single sweatshop computer.
- HIP puzzles are utilized that are difficult to relay as multimedia. By creating an animated puzzle web server S forces a visual relay between a bot node and a computer in the sweatshop that is difficult to accomplish as the relay involves costly video streaming; otherwise, multimedia relaying (e.g., images with skewed characters) would be the least expensive attack by the adversary.

It is to be appreciated that the disclosed keyed HIP approach can be employed as well in combination with systems that focus on computational effort spent by the client for each junk e-mail delivery.

The server costs for an "honest" user can be formulated as the following:

$$C_{S,2} = \frac{G_2}{L} + d_2 + d_3 + \varepsilon_2 + t_2$$

where the end-user does not have the player p, and executable $e_x$ installed. The cost of generating a unique player $G_2 \approx G_1$ can be amortized via an L-way reuse. Additionally, both the size of the player $d_2$, the common HIP puzzle $d_3$, and the response $\varepsilon_2$ will result in delivery costs that are proportional to the traditional system $d_3 \approx d_2 \approx d_1$, $\varepsilon_2 \approx \varepsilon_1$. An additional cost $t_2$ imposed upon web server S is caused by the verification of the answer which is performed on a per-key basis. This cost is reviewed below.

For the case when the end-user already has the player installed, the sever cost can be formulated as follows:

$$C_{S,3} = d_3 + \varepsilon_2 + t_2$$

Assuming an end-user solves K HIP puzzles during the life-time of the account from a single machine, by equating component costs between the traditional and the disclosed system, the total server cost for the account is the following:

$$KC_{S,1} \geq C_{S,2} + (K-1)C_{S,3}$$

$$t_2 \leq \frac{(K-1)G_1}{KL} - \frac{d_1}{K},$$

where the cost of the key-dependent puzzle verification is $t_2 \approx G_1/L$. By further reducing cost $t_2$, the disclosed system exhibits a lower cost than the traditional HIP system.

From the perspective of the adversary and a lowest-cost attack, the adversary is primarily interested in solving the HIP puzzle at minimal cost to access the service offered by the web server S. Alternate objectives such as an increase in costs of the web server S costs are not considered, since denial-of-service attacks may be much more potent than adjusting a HIP attack to increase server costs.

Figure 3:
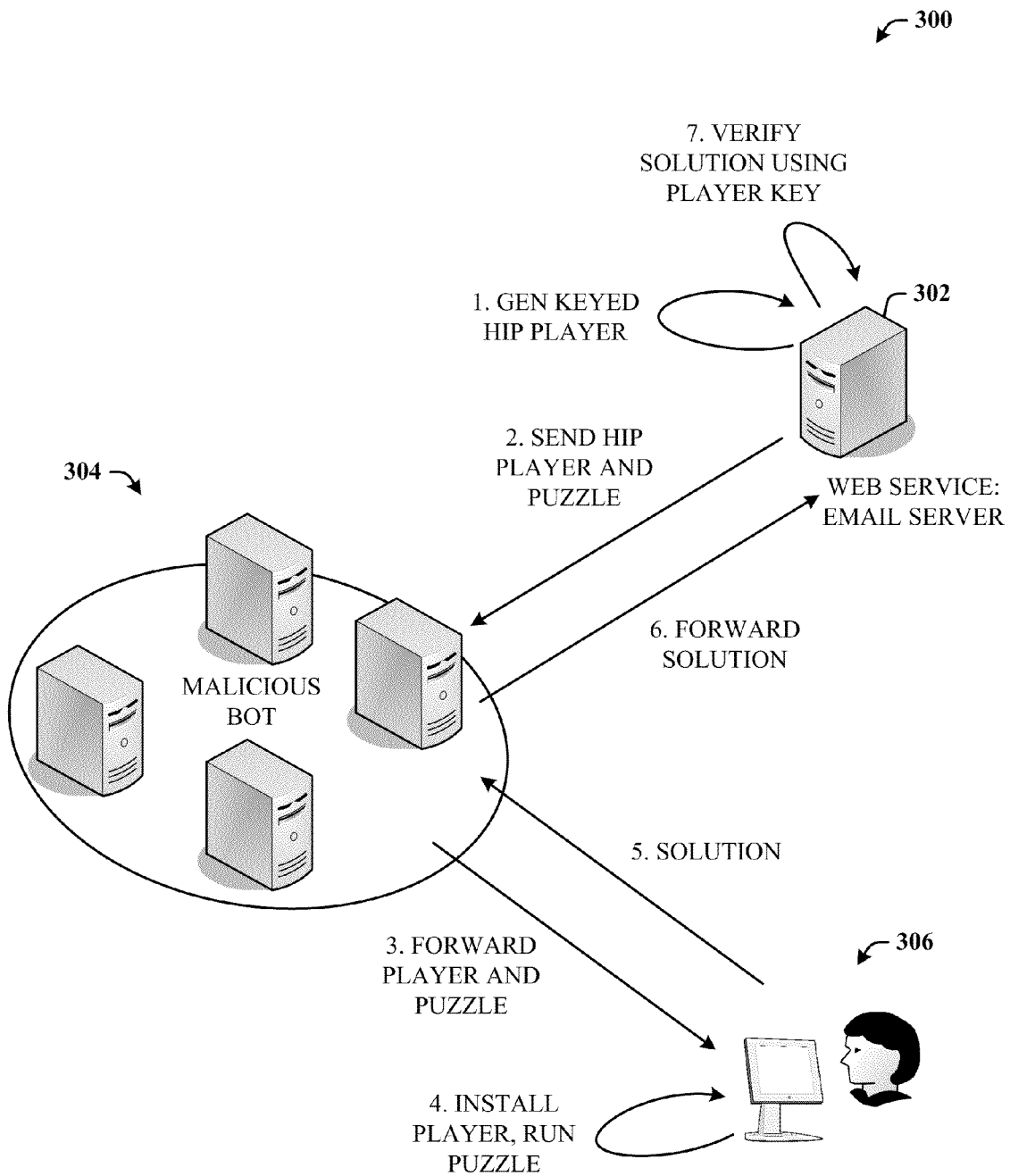
FIG. 3 illustrates a typical relay attack attempt using the disclosed key HIP player architecture.

FIG. 3 illustrates a typical relay attack attempt using the disclosed key HIP player architecture 300. An adversary approaches web server S 302 via a bot 304. The server 302 generates a distinctive keyed HIP player, and sends the distinctive HIP player as well as the HIP puzzle to the bot 304. The bot 304 forwards both files (HIP player and puzzle) to one of the sweatshop computer systems 306 with a human puzzle solver. There, the adversary installs the HIP player and displays the puzzle. After solving the puzzle, the puzzle solver forwards the solution back to web server S 302. If the solution is correct, the adversary receives access to the desired web service.

Once the HIP player is installed on an adversary machine, the adversary can use only this machine to solve HIP puzzles specific to the account and associated with the distinct key in the HIP player. The adversary cannot "cheat" by forwarding the installation files for a HIP player to an arbitrary machine. This is because puzzles are timed to completion with deadlines shorter than time $t_e$, the installation time for a HIP player, and once installed, the HIP player takes substantial storage space so that forwarding the installed player to another machine elsewhere on the web is costly.

For each HIP puzzle that involves installing a HIP player, the adversary faces the following cost:

$$C_{B_j,2} = p + \alpha + d_2 + d_3 + \epsilon_2$$

where $\alpha$ is the installation cost that manifests in two ways: the cost of storage at the client and the time required for the installation. For puzzles executed on an installed HIP player:

$$C_{B_j,3} = p + d_3 + \epsilon_2$$

Thus, for an adversary that uses an account of the web server S at total of K times, the total cost of this operation can be described as:

$$C_{B_j,2 \cup 3} = \alpha + d_2 + K(p + d_3 + \epsilon_2)$$

Thus, in order to substantially raise the minimal adversarial costs, the HIP player is designed such that the installation cost is much greater than the puzzle execution of an already-installed player (represented as $\alpha \gg C_{B_j,3}$).

The following observations can be made: "Honest" users will incur the cost of installing the HIP player only when opening an account or when sending a "spam-like" email from a machine which was not used to open the account (e.g., Internet cafe). The disclosed keyed HIP system substantially raises the cost of a multimedia relay attack by using animated puzzles. The adversary would be forced to relay video of the puzzle executed at the bot to a client as well as client's UI activity back to the bot in order to compute the solution to the puzzle at the bot. Moreover, the time to install or copy an installed HIP player is greater than the time to solve a puzzle. Accordingly, the server will time out an adversary who attempts to establish the "correct" HIP player at an arbitrary solver to an arbitrary solver just-in-time before feeding the player with the current HIP puzzle.

With respect to the machine-account relation in spam, consider the case where the adversary wants to send spam from an existing account. It is assumed that the Web-mail server detects outgoing spam-like messages and challenges senders to solve a HIP. The adversary must then solve the puzzle and send the email from the machine which opened the account; otherwise, the adversary faces the additional cost a to install the appropriate HIP player at another computer with a human puzzle solver. If the adversary chooses the first option, although $C_{B_i,1}=C_{B_i,3}$, the adversarial cost effectiveness is logistically higher because it is correct only if the attack is launched from the computer that opened the account. In the case of a traditional HIP system, the adversary can solve the HIP puzzle related to the spam message from an arbitrary computer. As a consequence, the disclosed approach substantially limits the computation power available to the adversary.

The distinct information in the HIP player is obfuscated. The obfuscation is sufficiently strong that by breaking one player the adversary cannot break all other players automatically with a low-cost attack.

With respect to answer collusion, the adversary is not able to conclude the answer to a keyed puzzle from previous answers to an arbitrary set of puzzles with known keys.

In support thereof, the disclosed HIP approach employs keyed and animated puzzles executed by HIP players which are distinct, obfuscated to the point where breaking a single player is a relatively costly operation, and where a small installation executable produces a large HIP player executable during a costly installation procedure. The cost of verifying an answer to a keyed-puzzle at the server is a computationally efficient procedure.

Following is a description of components of the disclosed keyed HIP system. In this implementation, a random graph is employed as the initial program state $s_x$. Consider an undirected graph g(V,E) where set V denotes vertices and set E denotes edges, for example, the Erdös-Rényi random graph model, g(n,p), defined by its cardinality $|V|=n$ and the probability of edge existence, p, which is uniform over E. In this model, the existence of each edge is independent from other edges in the graph.

Of interest is the entropy of a random graph. Since only one bit can decide between graph g and its complement graph g' (in graph theory the complement or inverse of a graph $(V,E_G)$ is a graph $H(V,E_H)$ such that two vertices of H are adjacent if and only if the two vertices are not adjacent in graph g), further focus is on g(n,p=0.5) random graphs. Assume that graph g is such that $|E|=pn(n-1)/2$ and observe that the minimum amount of storage required to store such a graph is $H(g)=n(n-1)/2$ bits.

Here, the initial program state $s_x$ in the HIP player is defined as a single (n, p=0.5) graph. A function $\rho: V^2 \rightarrow \{0, 1\}$ is deployed which returns a value of one if there exists an edge between the argument vertices, and a value of zero, if no edges exist. Let $T \subset V^2$ be defined as a list of distinct vertex pairings over V (e.g., $T=\{\{v_5, v_{17}\}, \{v_{15}, v_{33}\}\}$).

In the disclosed HIP system, the server challenges the client with a randomly selected subset of pairings $b_{f,x}=T$ over graph g. The client concatenates the output to each $\rho(t_i)$ into a string of bits, $\sigma=\rho(t_1) \rho(t_2) \ldots \rho(t_{|T|})$, that is used as a seed to initiate the PRNG in $p_x$. Then, the HIP player uses the PRNG to render a unique HIP puzzle animation $f_x$.

Denote $\theta$ the time required to generate a random bit at the client. In order to generate g at the client, executable $e_x$ needs to run at least $t_e=\theta n(n-1)/2$ time units. The server is not allowed to generate initial program state $s_x$ using executable $e_x$ when computing the string of bits $\sigma$ during the verification process. Thus, a binary tree of random numbers can be built, where the leaves a and b connect to a common root c, are computed as the first and second random numbers produced by a PRNG seeded with c, respectively. The root seed of the binary tree equals $k_x$. The binary tree is grown in a breadth-first recursive fashion until the number of leaves in the tree equals $|V|^2/2$. Alternatively, a strategy can be employed in which the least significant bit of the value of each leaf defines whether the associated edge is existent or non-existent in $V^2$. Thus, in order to generate each edge in E, $(n^2)$ random numbers are generated using the PRNG at the client; however, at the server, only $(|T| \log n)$ random numbers are utilized during puzzle verification. Additionally, in the disclosed keyed HIP system each client receives a unique graph g.

An alternative approach to creating initial program state $s_x$ can be to store a single graph at the server and deliver distinct isomorphic graphs to clients. In this scenario, the server memorizes only the permutation of vertices that reverses the isomorphism between the graph stored at the server and a specific client graph. This approach improves the cost at the server; however, raises the risk that adversarial users can identify graph isomorphisms (an open problem in terms of computational complexity) and delegate states to the network of bots. The latter action, if completed, might enable the adversary to reinstall a specific HIP player at an arbitrary sweatshop computer relatively inexpensively.

With respect to animated puzzles, the client HIP player $p_x$ takes as input program state $s_x$, random substate $b_{f,x}$ and puzzle f, generates the string of bits $\sigma$ from $s_x$ and $b_{f,x}$ and then uses the bits $\sigma$ as a seed to create a unique animated puzzle $f_x$ from the public puzzle description file f. Such a puzzle could be created in many ways.

As utilized herein, when using animation, one or several screen snapshots cannot define the solution to the puzzle, which is central in preventing a simple multimedia relaying attack. For example, if a HIP puzzle includes a panel where appearing and disappearing photos of cats and dogs are moved around following random trajectories, the user needs to select photos of, for example, all dogs on the panel, by clicking on the photo at its current location. The solution constitutes a series of clicks and associated timestamps. Similarly, a user can be asked to recognize transformed letters (which are difficult for an OCR program to recognize) from the images that are in motion and following a random trajectory. For each individual frame of the animation, only a small time-varying part of each letter is revealed to the user. In general, there are numerous possibilities for development.

With respect to program obfuscation in the disclosed HIP system, the executable $e_x$ and player $p_x$ are individualized and obfuscated. Since executable $e_x$ is a program that does not take any input (it generates program state $s_x$), the obfuscation of executable $e_x$ is obtained by colluding N different executable copies $e_1, \ldots, e_N$; a potential adversary cannot extract any of the associated keys $k_1, \ldots, k_N$ in an inexpensive fashion.

The obfuscation of player $p_x$ can be demanding as player $p_x$ has as input puzzle f, state $s_x$, and substate $b_{f,x}$. While puzzle f and state $s_x$ are treated as public information, web server S communicates details of the challenge $b_{f,x}$ privately to player $p_x$. This can be achieved using a symmetrically encrypted communication channel, in which case, the client-unique encryption key is obfuscated within the player $p_x$ (a type-III obfuscation of player $p_x$). In addition, the output stage of the function that computes the bits $\sigma$ (the input to the function that renders the animation) is obfuscated so that trivial hacking cannot identify the dataflow. The output of the player $p_x$ (the user-generated solution to the animated puzzle) is public information that does not need obfuscation and/or encryption.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
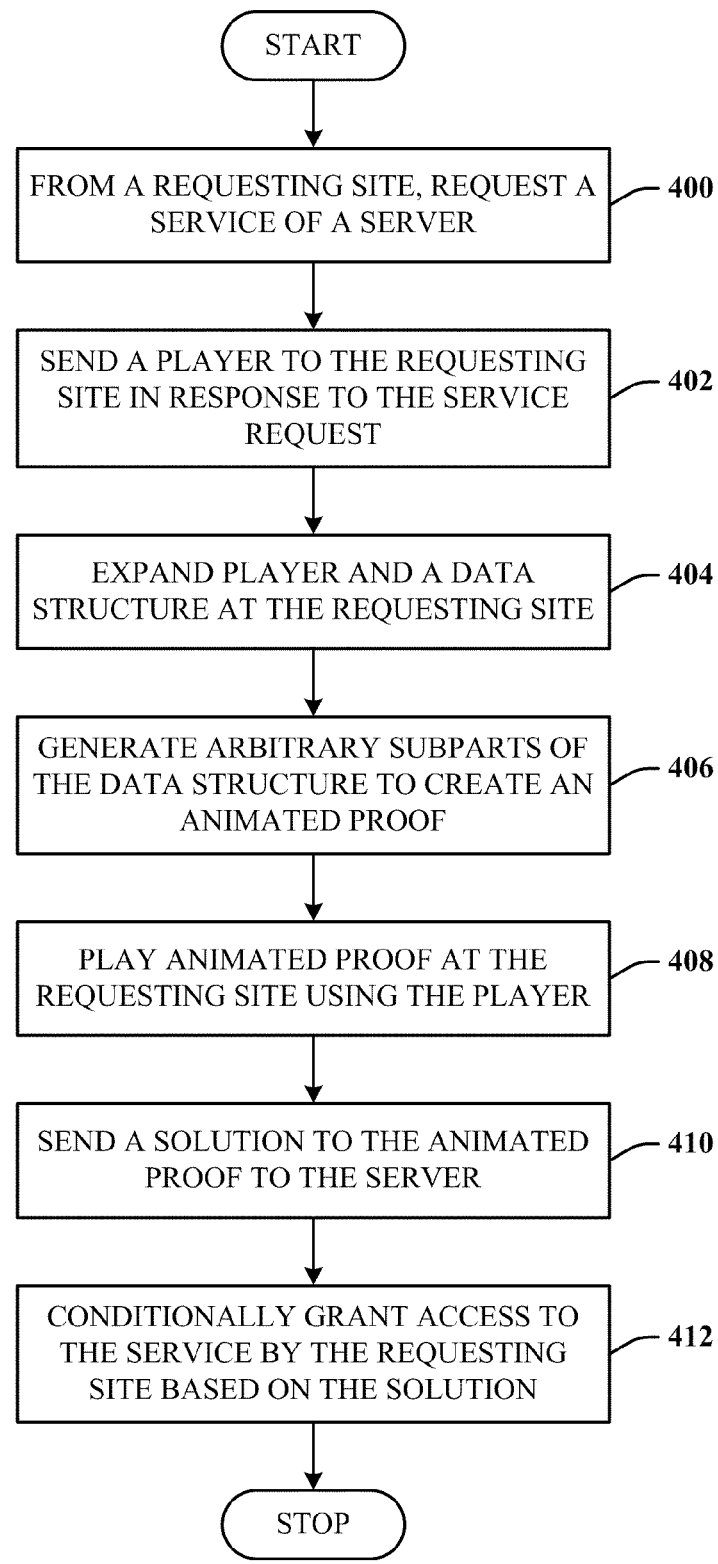
FIG. 4 illustrates a computer-implemented authorization method in accordance with the disclosed architecture.

FIG. 4 illustrates a computer-implemented authorization method in accordance with the disclosed architecture. At 400, from a requesting site, request a service of a server. At 402, a player is sent to the requesting site in response to the service request. At 404, the player and a data structure are expanded at the requesting site. At 406, arbitrary subparts of the data structure are generated to create an animated proof. At 408, the animated proof is played at the requesting site using the player. At 410, a solution to the animated proof is sent to the server. At 412, access to the service by the requesting site is conditionally granted based on the solution.

Figure 5:
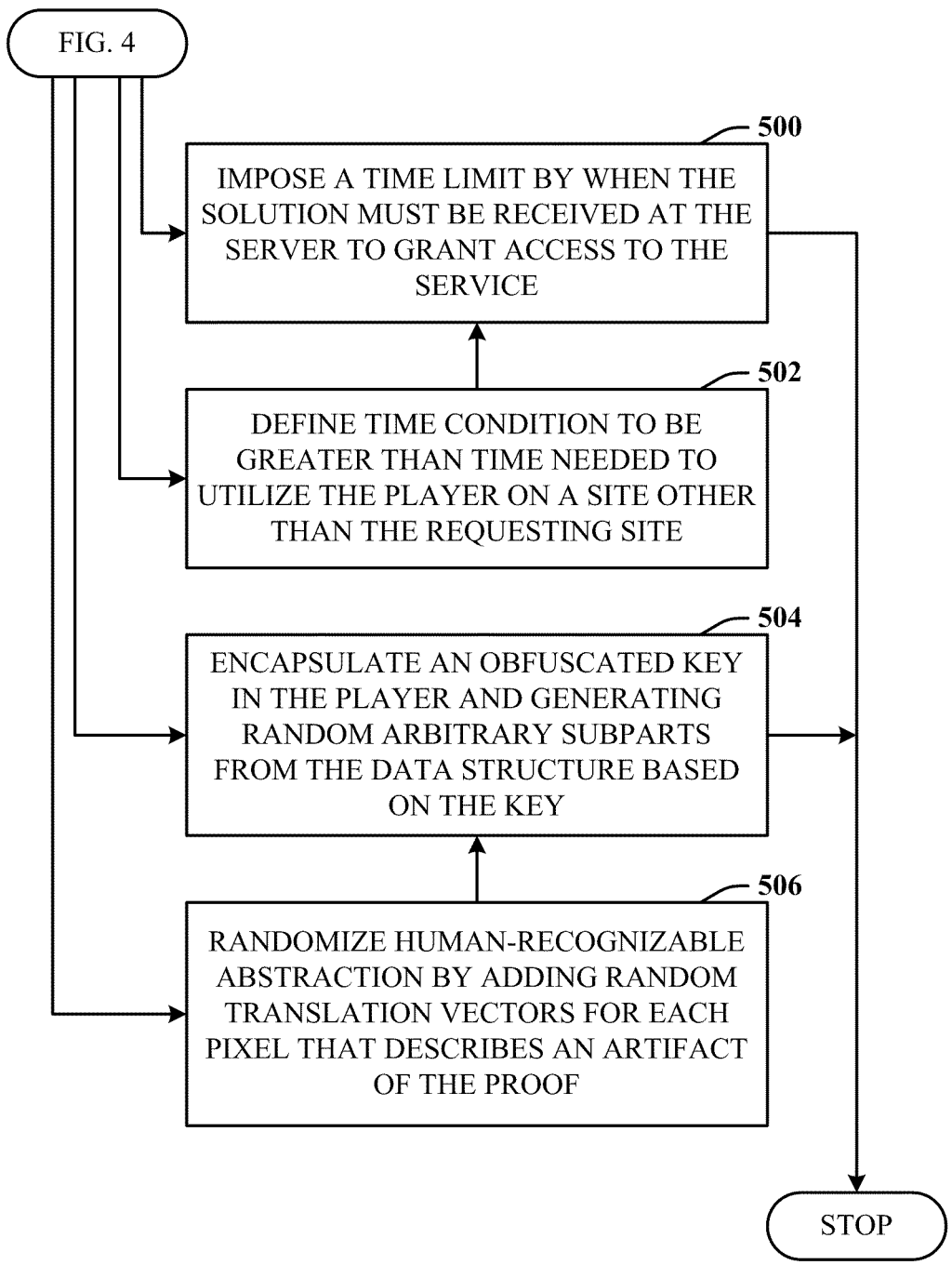
FIG. 5 illustrates further aspects of the method of FIG. 4.

FIG. 5 illustrates further aspects of the method of FIG. 4. Note that the arrowing indicates that each block represents a step that can be included, separately or in combination with other blocks, as additional steps of the method represented by the flow chart of FIG. 4. At 500, a time limit by when the solution must be received at the server is imposed to grant access to the service. At 502, the time condition is defined to be greater than time needed to utilize the player on a site other than the requesting site. At 504, an obfuscated key is encapsulated in the player and random arbitrary subparts generated from the data structure based on the key. The animated proof is a HIP and the player plays the HIP to expose a human-recognizable abstraction to which the solution is requested. At 506, the human-recognizable abstraction is randomized by adding random translation vectors for each pixel that describes an artifact of the proof.

Figure 6:
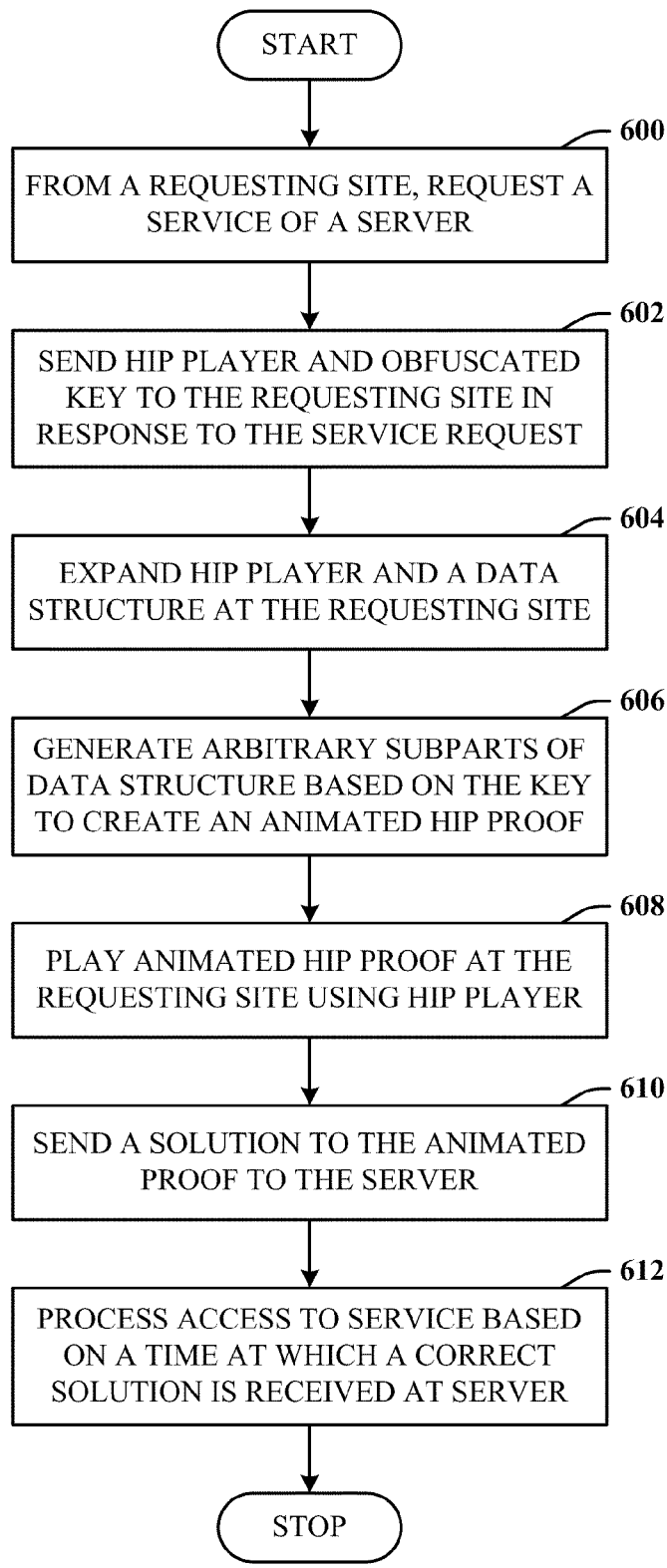
FIG. 6 illustrates an alternative computer-implemented authorization method in accordance with the disclosed architecture.

FIG. 6 illustrates an alternative computer-implemented authorization method in accordance with the disclosed architecture. At 600, from a requesting site, request a service of a server. At 602, a HIP player and obfuscated key are sent to the requesting site in response to the service request. At 604, the HIP player and a data structure are expanded at the requesting site. At 606, arbitrary subparts of the data structure are generated based on the key to create an animated HIP proof. At 608, the animated HIP proof is played at the requesting site using the HIP player. At 610, a solution to the animated proof is sent to the server. At 612, access to the service is processed based on a time at which a correct solution is received at the server.

Figure 7:
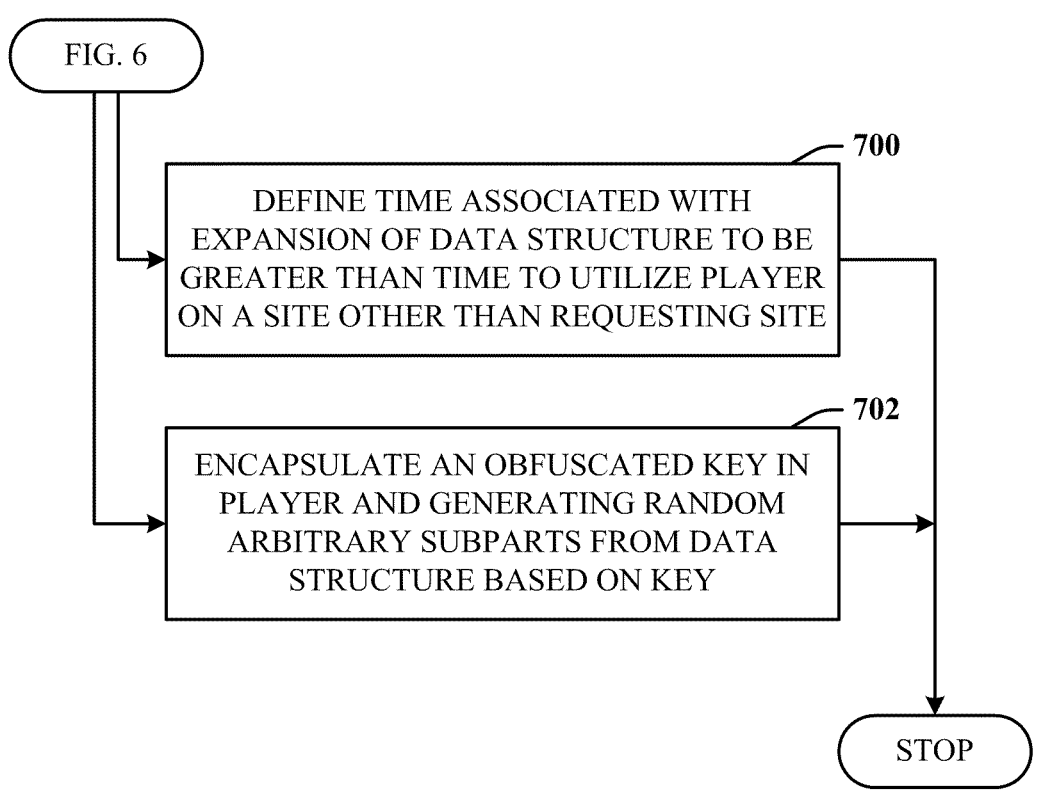
FIG. 7 illustrates further aspects of the method of FIG. 6.

FIG. 7 illustrates further aspects of the method of FIG. 6. Note that the arrowing indicates that each block represents a step that can be included, separately or in combination with other blocks, as additional steps of the method represented by the flow chart of FIG. 6. At 700, time associated with expansion of the data structure is defined to be greater than the time to utilize the player on a site other than the requesting site. At 702, an obfuscated key is encapsulated in the player and generating random arbitrary subparts from the data structure based on the key. The HIP player plays the animated HIP proof to expose a human-recognizable abstraction to which the solution is requested. The server processes the solution based on the animated HIP proof and a pointer to the arbitrary subparts.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
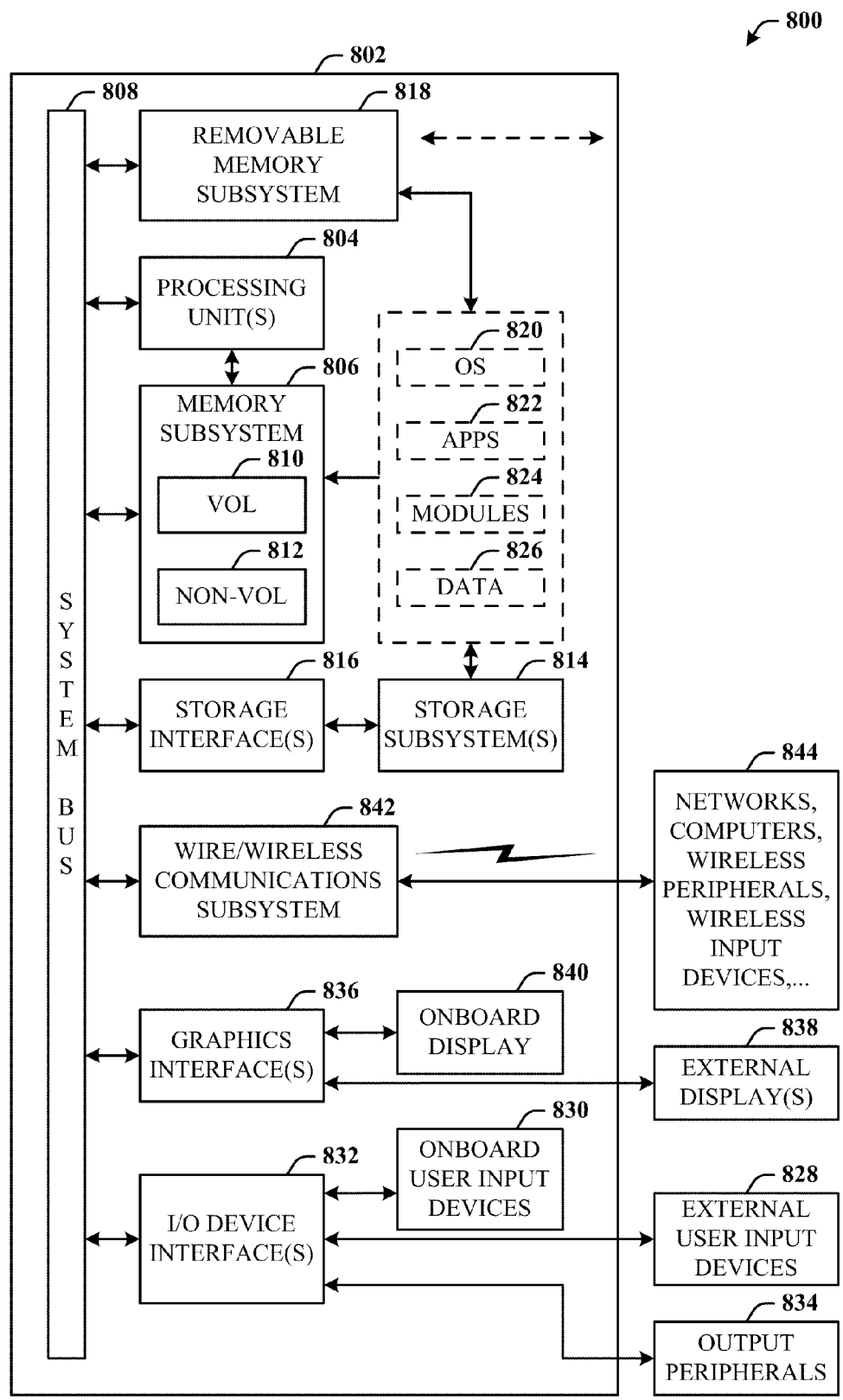
FIG. 8 illustrates a block diagram of a computing system that executes a keyed HIP player for authorization in accordance with the disclosed architecture.

Referring now to FIG. 8, there is illustrated a block diagram of a computing system 800 that executes a keyed HIP player for authorization in accordance with the disclosed architecture. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage (physical storage media) such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the entities and components of the system 100 of FIG. 1, the entities and components of the system 200 of FIG. 2, the entities and flow of the diagram 300 of FIG. 3, and the methods represented by the flowcharts of FIGS. 4-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented authorization system, comprising:
   an authorization component that generates a distinctive key in response to opening an account, the key used to create a correspondingly distinctive player associated with the account that plays an animated puzzle description uniquely associated with the player and to create an executable that builds a data structure;
   a requesting component that installs the player and runs the executable that expands during installation to produce the data structure, such that the distinctive player installed with the data structure as expanded takes substantial storage space so that forwarding the player to another machine is costly, wherein the player plays the animated puzzle description as a human-recognizable abstraction for which a distinctive solution associated with the account is input and sent to the authorization component to obtain the account; and
   a microprocessor that executes computer-executable instructions associated with at least one of the authorization component or the requesting component.

2. The system of claim 1, wherein the player is a human interactive proof (HIP) player created specific to the key.

3. The system of claim 1, wherein the key is obfuscated in the player.

4. The system of claim 1, wherein the data structure is permanent or perishable.

5. The system of claim 1, wherein the player is an HIP player as a browser plug-in.

6. The system of claim 1, wherein the key defines the data structure of the executable.

7. The system of claim 1, wherein the authorization component sends the animated puzzle description and a pointer to arbitrary subparts of the data structure to the requesting component to create the animated puzzle description.

8. The system of claim 7, wherein the authorization component verifies the solution based on the animated puzzle description and the pointer.

9. The system of claim 1, wherein the data structure expands according to a time that is greater than a time to utilize the player at a location different than the requesting component.

10. A computer-implemented authorization method performed by a computer system executing machine-readable instructions, the method comprising acts of:
    from a requesting site, requesting a service for opening an account of a server;
    sending a player distinctively created for the account to the requesting site in response to the service request;
    expanding the player and a data structure during installation at the requesting site such that the distinctive player installed with the data structure as expanded takes substantial storage space so that forwarding the player, as installed, to another machine is costly, wherein;
    generating arbitrary subparts of the data structure to create an animated proof uniquely associated with the player;
    playing the animated proof at the requesting site using the player to produce a distinctive solution associated with the account;
    sending the solution to the animated proof to the server;
    conditionally granting access to the service by the requesting site based on the solution; and
    configuring at least one processor to perform at least one of the acts of requesting, sending, expanding, generating, playing, or conditionally granting.

11. The method of claim 10, further comprising imposing a time limit by when the solution must be received at the server to grant access to the service.

12. The method of claim 11, further comprising defining the time condition to be greater than time needed to utilize the player on a site other than the requesting site.

13. The method of claim 10, further comprising encapsulating an obfuscated key in the player and generating random arbitrary subparts from the data structure based on the key.

14. The method of claim 10, wherein the animated proof is a human interactive proof (HIP) and the player plays the HIP to expose a human-recognizable abstraction to which the solution is requested.

15. The method of claim 14, further comprising randomizing the human-recognizable abstraction by adding random translation vectors for each pixel that describes an artifact of the proof.

16. A computer-implemented authorization method performed by a computer system executing machine-readable instructions, the method comprising acts of:
    from a requesting site, requesting a service for opening an account of a server;
    sending a distinctive human interactive proof (HIP) player and obfuscated key associated with the account to the requesting site in response to the service request;
    expanding the HIP player and a data structure at the requesting site during installation expands during installation to produce an expanded data structure such that the distinctive HIP player installed with the expanded data structure takes substantial storage space so that forwarding the player to another machine is costly;
    generating arbitrary subparts of the data structure based on the key to create an animated HIP proof uniquely associated with the player;
    playing the animated HIP proof at the requesting site using the HIP player to produce a distinctive solution associated with the account;
    sending the solution to the animated proof to the server;
    processing access to the service based on a time at which a correct solution is received at the server; and
    configuring at least one processor to perform at least one of the acts of requesting, sending, expanding, generating, playing, or processing.

17. The method of claim 16, further comprising defining time associated with expansion of the data structure to be greater than time to utilize the player on a site other than the requesting site.

18. The method of claim 16, further comprising encapsulating an obfuscated key in the player and generating random arbitrary subparts from the data structure based on the key.

19. The method of claim 16, wherein the HIP player plays the animated HIP proof to expose a human-recognizable abstraction to which the solution is requested.

20. The method of claim 16, wherein the server processes the solution based on the animated HIP proof and a pointer to the arbitrary subparts.

* * * * *